US006934097B2

United States Patent
Shimizu

(10) Patent No.: US 6,934,097 B2
(45) Date of Patent: Aug. 23, 2005

(54) ROD INTEGRATOR HOLDER AND PROJECTION TYPE IMAGE DISPLAY APPARATUS HAVING THE ROD INTEGRATOR HOLDER

(75) Inventor: Hitoshi Shimizu, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/739,018

(22) Filed: Dec. 19, 2003

(65) Prior Publication Data

US 2004/0130795 A1 Jul. 8, 2004

(30) Foreign Application Priority Data

Jan. 7, 2003 (JP) ........................................ 2003-001539

(51) Int. Cl.7 ................................................ G02B 7/02
(52) U.S. Cl. ...................... 359/819; 359/799; 359/810; 359/830; 359/800
(58) Field of Search ................................ 359/819, 799, 359/800, 810, 830; 385/901; 349/61

(56) References Cited

U.S. PATENT DOCUMENTS 6,715,880 B2 * 4/2004 Shouji ......................... 353/20

2002/0008791 A1 * 1/2002 Okamori et al. ................ 349/5
2003/0031031 A1 * 2/2003 Tiao et al. ................... 362/560
2003/0147154 A1 * 8/2003 Shimizu et al. ............. 359/819

FOREIGN PATENT DOCUMENTS

| JP | 08-227034 | 9/1996 |
| JP | 11-326727 | 11/1999 |
| JP | 2002-131840 | 5/2002 |
| JP | 2003-232974 | 8/2003 |

* cited by examiner

Primary Examiner—Ricky L. Mack
Assistant Examiner—Brandi N. Thomas
(74) Attorney, Agent, or Firm—Snider & Associates; Ronald R. Snider

(57) ABSTRACT

A rod integrator holder 6 has concave clearance grooves 67A to 67D elongated in the direction of the optical axis L, at the corners within a case 61 thereof. The clearance grooves 67A to 67D are configured such that the edges 84A to 84D of the rod integrator 8 can be prevented from coming into contact with the inner faces 66A to 66D of the case 61. The edges 84A to 84D of the rod integrator can be prevented from being broken by coming into contact with the inner faces 66A to 66D of the case 61, and the edges 84A to 84D of the rod integrator 8 and the inner faces 66A to 66D of the case 61 can be prevented from rubbing against each other to generate dust due to abrasion.

5 Claims, 7 Drawing Sheets

ROD INTEGRATOR HOLDER AND PROJECTION TYPE IMAGE DISPLAY APPARATUS HAVING THE ROD INTEGRATOR HOLDER

RELATED APPLICATIONS

This application claims the priority of Japanese Patent Application No. 2003-001539 filed on Jan. 7, 2003, which is incorporated herein by reference.

BACKGROUND OF THE INVENTION

1. Field of the Invention

The present invention relates to a rod integrator holder that holds a rod integrator disposed on an optical path to homogenize the luminous flux density within a plane perpendicular to the optical axis in an illumination optical system or the like of a projection type image display apparatus, and to a projection type image display apparatus having the same.

2. Description of the Prior Art

In illumination optical systems of projection type image display apparatuses such as video projectors in which illumination light is optically modulated by an image display device such as a digital micromirror device (hereinafter referred to as "DMD") and the thus modulated light is projected under magnification, optical prisms known as rod integrators have conventionally been used as means for homogenizing the luminous flux density in order to illuminate the image display device uniformly. The rod integrators have been configured such that an incident luminous flux is repeatedly totally reflected therewithin and then is emitted therefrom while the luminous flux density distribution within a plane perpendicular to the optical axis becomes substantially uniform. In particular, within an illumination optical system, a rod integrator is often disposed downstream of a color wheel apparatus acting as color decomposing means.

As a holding structure for holding this kind of rod integrator within an illumination optical system, various types have conventionally been known (see Patent Documents 1 to 3 shown below). In these holding structures, since the light exit face of the rod integrator is exposed, the following problem arises:

Since the light exit face of the rod integrator is exposed, the light exit face can be damaged and dust or the like can attach to the light exit face. An illumination optical system using a rod integrator is configured such that the light exit face of the rod integrator and the device surface of an image display device have an optically conjugate relationship therebetween. Therefore, if the light exit face of the rod integrator is damaged or dust or the like attaches thereto, an image of dust or the like will be formed on the device surface of the image display device. The image of damage, dust, or the like formed on the device surface is superposed on an image displayed by the image display device, and is projected onto a screen under magnification.

In view of the foregoing circumstances, the inventor of the present application has proposed a rod integrator holder capable of holding a rod integrator while the light exit face thereof is tightly closed (see Patent Document 4 shown below). This rod integrator holder comprises: a tubular case for inserting and holding the rod integrator; and a brim-like wall provided at one end part of the case. By allowing the brim-like wall to abut against one end part of the lens barrel, the space between the lens barrel and the case is tightly closed.

[Patent Document 1]

Japanese Unexamined Patent Publication No. H08-227034

[Patent Document 2]

Japanese Unexamined Patent Publication No. H11-326727

[Patent Document 3]

Japanese Unexamined Patent Publication No. 2002-131840

[Patent Document 4]

Japanese Unexamined Patent Publication No. 2003-232974

When the rod integrator is held by being inserted in a tubular case, in order that the side faces of the rod integrator and the inner faces of the case are not in contact with each other, a predetermined gap is interposed therebetween. It is desirable that this gap be as small as possible. When this gap is large, the possibility increases that part of the light from the light source section passes through the gap and the shape of the gap is projected onto the screen through the image display device.

However, when this gap is small, the following problem arises: The rod integrator is held within the case through a plate spring, an adhesive or the like, and when the gap is small, it is more likely that the edges of the rod integrator in the direction of the length (the direction of the optical axis) come into contact with the inner faces of the case when some vibration is applied. Since the edges of the rod integrator are weak in strength, when they come into contact with the inner faces of the case, there are possibilities where they are broken and desired optical performance cannot be obtained and that the edges of the rod integrator and the inner faces of the case rub against each other to generate dust due to abrasion. When dust due to abrasion is caused, the dust attaches to the light exit face of the rod integrator and is projected onto the screen under magnification as mentioned above.

SUMMARY OF THE INVENTION

In view of the foregoing circumstances, it is an object of the present invention to provide a rod integrator holder having a tubular case in which a rod integrator is inserted, the rod integrator holder being capable of preventing the edges of the rod integrator from being broken by coming into contact with the inner faces of the case and preventing the edges of the rod integrator and the inner faces of the case from rubbing against each other to generate dust due to abrasion, and a projection type image display apparatus having such a rod integrator.

For achieving the above-mentioned object, the present invention provides a rod integrator holder having a tubular case in which a rod integrator is inserted, the rod integrator homogenizing a density of an incident luminous flux and emitting the density-homogenized luminous flux, wherein a concave clearance groove capable of preventing an inner face of the case and an edge of the rod integrator from coming into contact with each other is provided at a corner within the case so as to be laid on both of the adjoining inner faces of the case.

Moreover, the rod integrator holder of the present invention may be configured such that a brim-like wall substantially orthogonal to an axis of the case is provided at one end part of the case, and by allowing the brim-like wall to abut against a light entrance end side of a lens barrel, a space between the lens barrel and the case is tightly closed.

Moreover, the present invention provides a projection type image display apparatus comprising: an illumination optical system in which the rod integrator holder of the present invention having the above-mentioned characteristics is disposed; image display means for converting illumination light from the illumination optical system into image display light carrying image information, and outputting thus obtained image display light; and a projection lens system emitting the image display light from the image display means and projecting an image onto an image projection surface.

The rod integrator holder may be configured such that a side face of the case is formed with an adhesive injection hole into which a predetermined adhesive is injected, the rod integrator inserted in the case being secured and held within the case by the adhesive injected from the adhesive injection hole.

An outer peripheral part of the brim-like wall may be formed with a circumferential projection for covering an outer peripheral face of an end part of the lens barrel when the brim-like wall abuts against the end part of the lens barrel.

The above-described rod integrator has edges (angular edge parts) elongated in the direction of its length (the direction of the optical axis), and the side faces formed between the edges may be plane or curved. Consequently, its cross section perpendicular to the direction of the optical axis may not have only a polygonal shape including a rectangle where all of the sides of the cross section are linear but also a semicircular shape where some of the sides of the cross section are curved or an asteroidal shape where all of the sides of the cross section are curved.

Moreover, it is desirable that the case of the rod integrator holder be such that the inner configuration of its cross section perpendicular to the direction of the length (the direction of the optical axis) is similar to the configuration of the cross section of the rod integrator and is slightly larger in size (for example, a configuration enlarged so as to be substantially similar).

DESCRIPTION OF THE PREFERRED EMBODIMENTS

Figure 6:
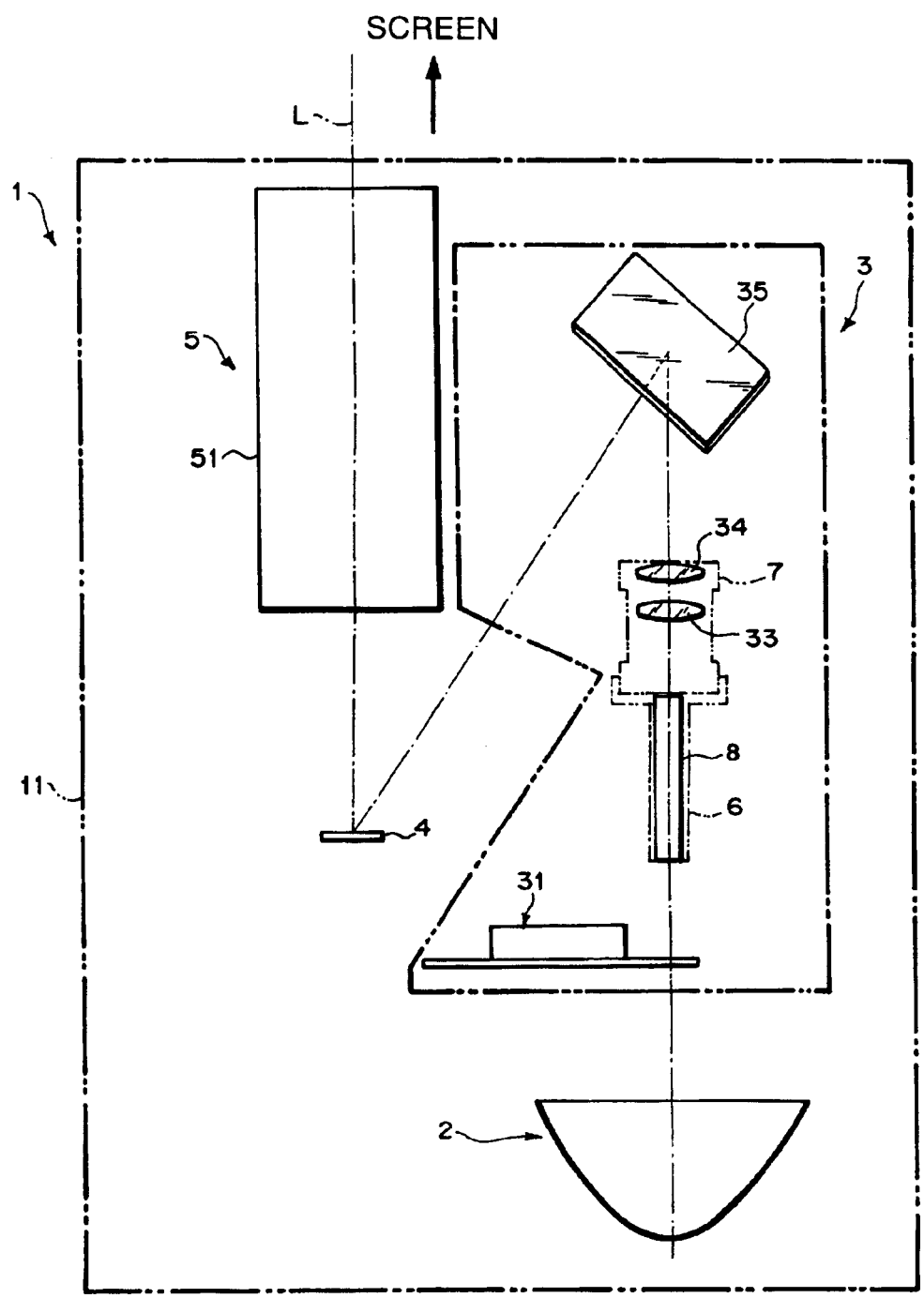
FIG. 6 is a view showing a general structure of a projection type image display apparatus in accordance with the embodiment of the present invention.

An embodiment of the present invention will be described in detail with reference to the drawings. FIG. 6 is a view showing a general structure of a projection type image display apparatus in accordance with an embodiment of the present invention.

The projection type image display apparatus 1 shown in FIG. 6 is used, for example, as a video projector. Within its housing 11, a light source section 2, an illumination optical system 3, an image display means 4, and a projection lens system 5 are disposed on an optical axis L.

The illumination optical system 3 comprises a color wheel apparatus 31 for decomposing a white luminous flux from the light source section 2 into three colors of R, G, and B in time division. Disposed downstream of the color wheel apparatus 31 and held by a rod integrator holder 6 is a rod integrator 8 for homogenizing the density of color-decomposed luminous fluxes. A relay lens barrel 7 holding two relay lenses 33 and 34 is disposed downstream the rod integrator 8, whereas a reflecting mirror 35 is placed downstream thereof. The illumination optical system 3 is configured such that the luminous flux incident thereon from the light source section 2 is converted into illumination light having a homogenized luminous flux density within a plane perpendicular to the optical axis L and thus obtained illumination light is emitted toward the image display means 4.

As the image display means 4, a DMD (digital micromirror device) is used, for example. The DMD comprises a mirror surface in which a very large number of mirror devices (aluminum mirrors each having a rectangular form) are arranged on a substrate, and is configured such that the direction of reflection of each mirror device constituting the mirror surface is independently switchable between two directions (forming a narrow angle of 20° or 24° therebetween). The switching of reflecting directions is carried out by ON/OFF control of image signals (video signals) input into the DMD using each mirror device as a pixel. Under this control, the image display means 4 converts the illumination light incident thereon from the illumination optical system 3 into image display light carrying image information and emits the thus obtained image display light toward the projection lens system 5.

The projection lens system 5 comprises, though not depicted, a projection lens composed of a plurality of lenses disposed in series on the optical axis L within a projection lens barrel 51, and a lens moving mechanism adapted to move the plurality of lenses in the direction of optical axis L so as to change the focal length, thereby altering the imaging magnification or the like. The projection lens system 5 is configured so as to project onto an image projection surface (screen) the image display light incident thereon from the image display means 4.

The rod integrator 8 has its light exit end held so as to be tightly closed by the rod integrator holder 6 and the relay lens barrel 7. The configuration of the tightly closed structure and the rod integrator holder 6 will be described in greater detail with reference to FIG. 1 to FIG. 3.

Figure 1:
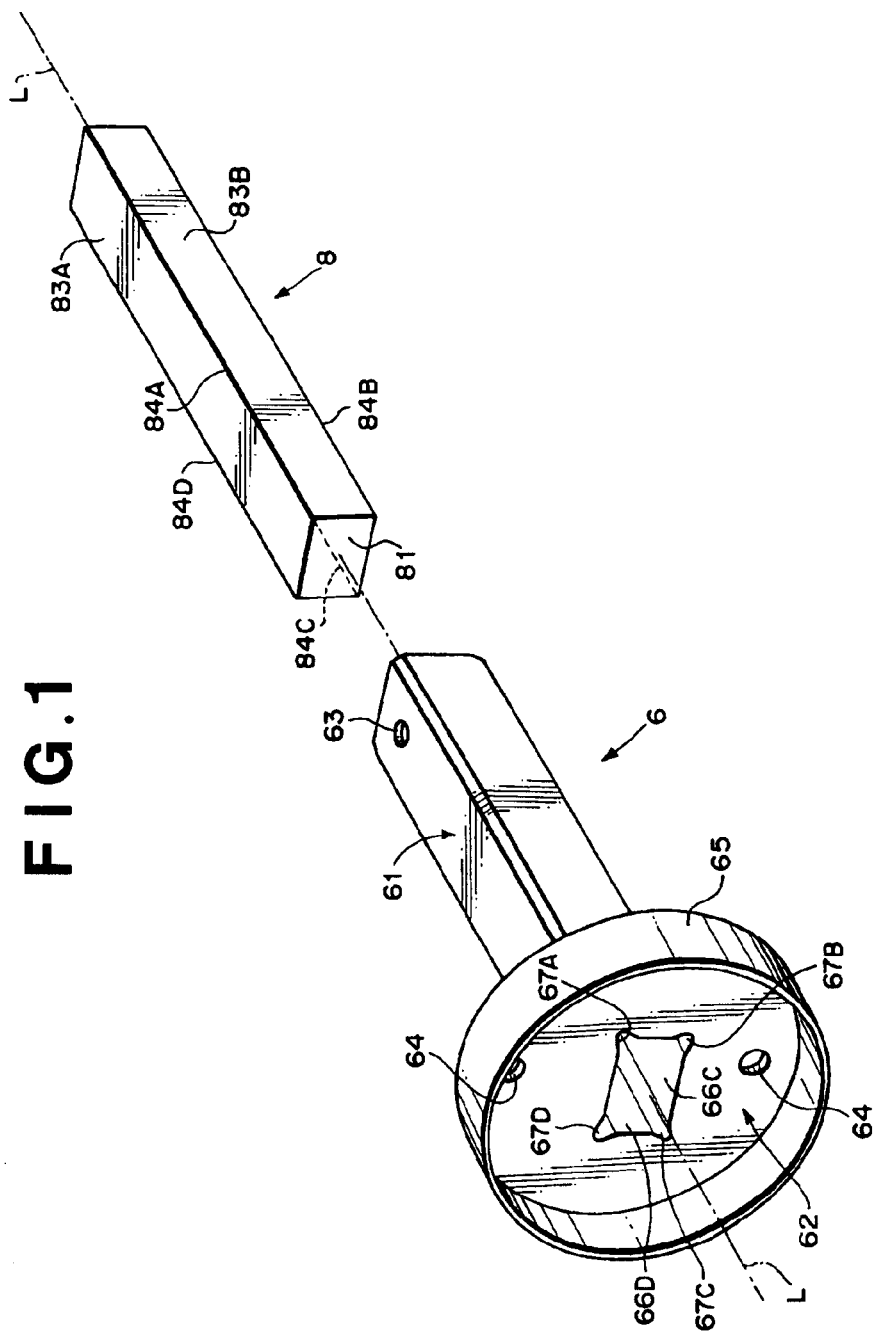
FIG. 1 is a perspective view showing the exterior of a rod integrator holder in accordance with an embodiment of the present invention.
Figure 2:
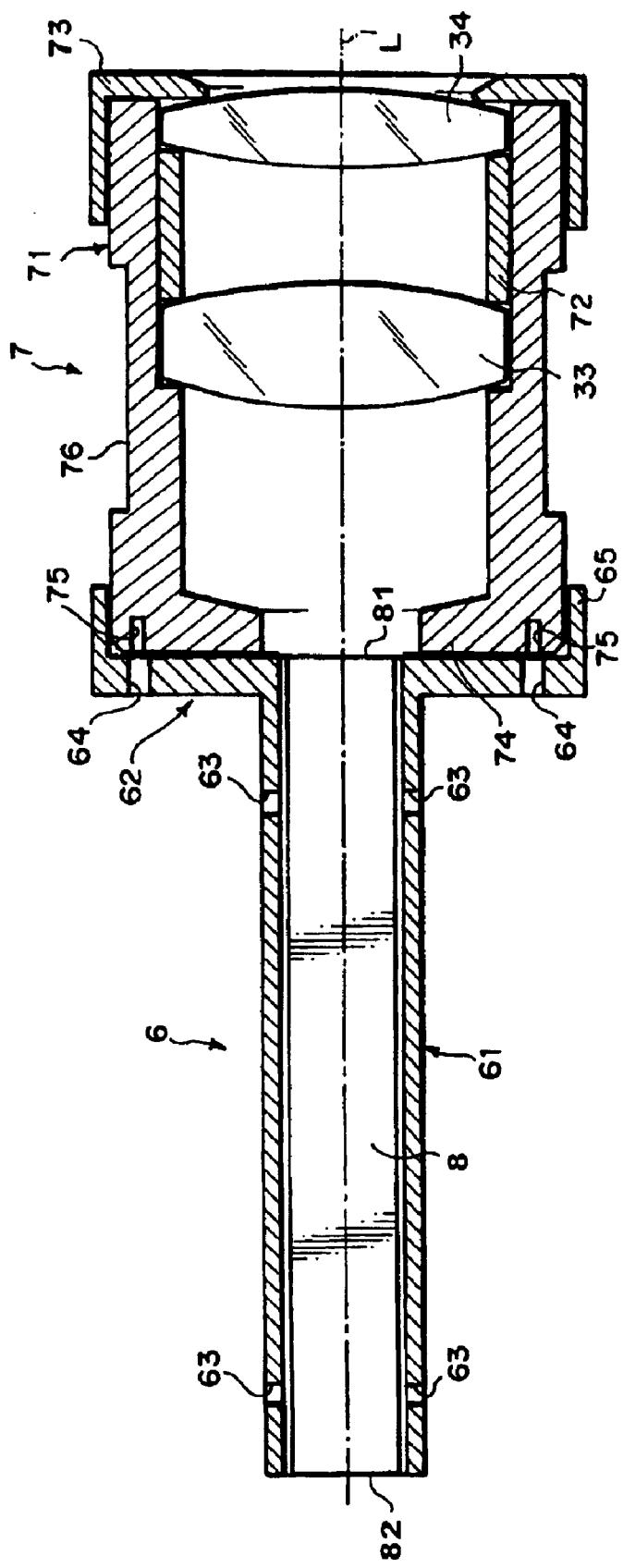
FIG. 2 is a sectional view showing a structure for tightly closing an exit end by the rod integrator holder shown in FIG. 1.
Figure 3:
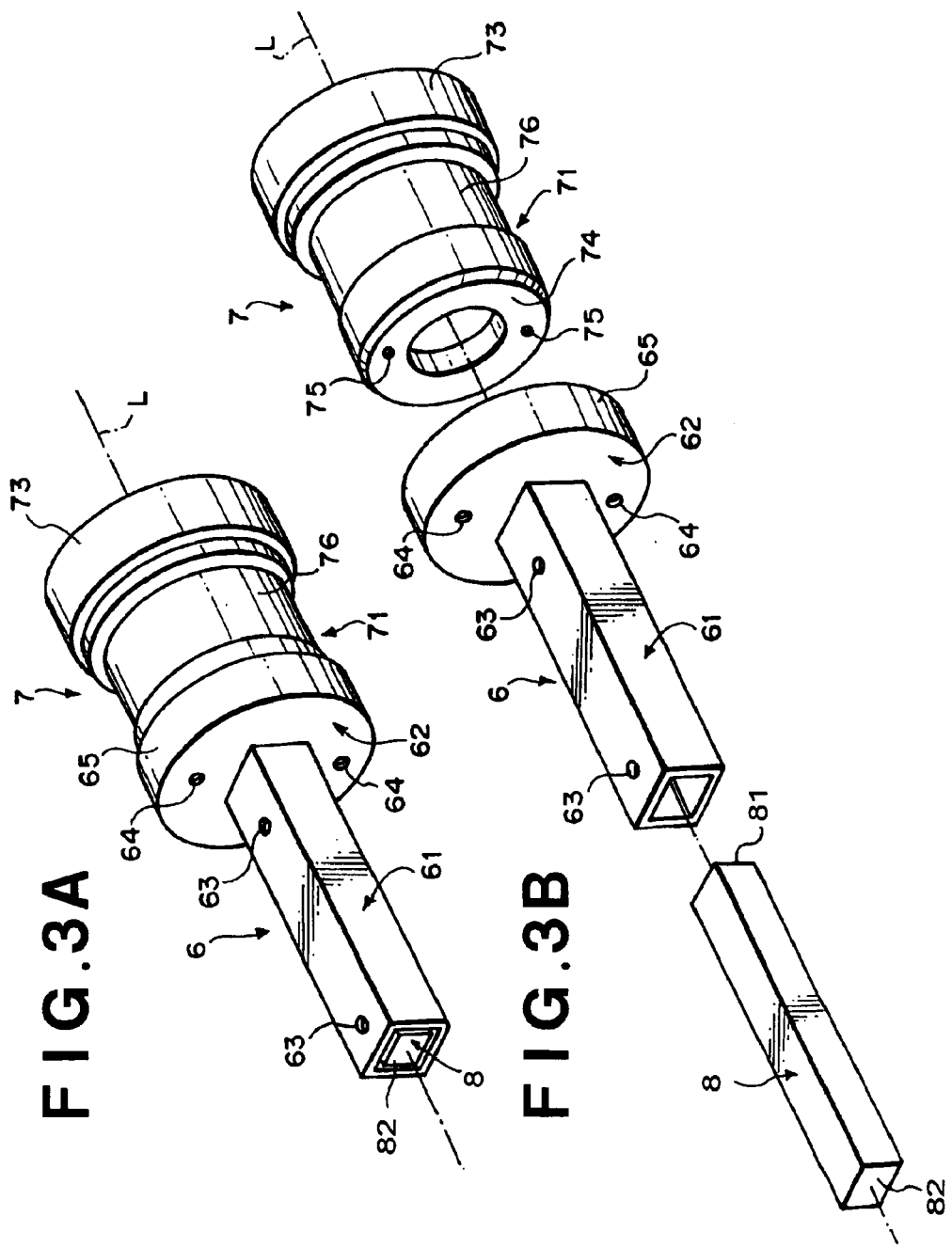
FIG. 3A and FIG. 3B are perspective views showing the exterior of main parts of the light exit end tightly closed structure shown in FIG. 2.

FIG. 1 is a perspective view showing the exterior of the rod integrator holder 6 and the rod integrator 8. FIG. 2 is a sectional view showing main parts of the structure for tightly closing the light exit end by the rod integrator holder 6 in a state partly cut along the optical axis L direction. FIG. 3A and FIG. 3B are perspective views showing the exterior thereof. FIG. 3A shows a state where the rod integrator 8, rod integrator holder 6, and relay lens barrel 7 are assembled together, whereas FIG. 3B shows a state where they are disassembled.

In the tightly closed structure shown in FIG. 2, the rod integrator holder 6 holding the rod integrator 8 is attached to the relay lens barrel 7 holding the relay lenses 33 and 34.

The rod integrator holder 6 comprises a case 61 having a rectangular frame-like cross section into which the rod integrator 8 is inserted, and a brim-like wall 62 formed at one end part (the end part closer to the light exit face 81 of the inserted rod integrator 8) in the axial direction (length direction) of the case 61. As shown in FIG. 1, adhesive injection holes 63 into which a predetermined adhesive is injected are formed two by two in the upper and lower side faces of the case 61, whereby the rod integrator 8 inserted in the case 61 is secured and held within the case 61 by the adhesive injected from the adhesive injection holes 63. Also, the brim-like wall 62 is formed like a disk substantially orthogonal to an axis of the case 61 while being centered at this axis. Screw holes 64 for inserting screws, which are not depicted, are formed one by one at upper and lower positions in the brim-like wall 62 across the case 61. Further, the outer periphery of the brim-like wall 62 is formed with a circumferential projection 65 rising toward the relay lens barrel 7. Here, the case 61, brim-like wall 62, and circumferential projection 65 are integrally formed by deep drawing.

On the other hand, the relay lens barrel 7 comprises a barrel body 71 formed substantially cylindrical, a spacer ring 72 disposed between the two relay lenses 33 and 34 held within the barrel body 71, and a support ring 73 attached to the light exit end side of the barrel body 71. The light entrance end of the barrel body 71 is formed with an abutment 74 adapted to abut against the brim-like wall 62 of the rod integrator holder 6. The abutment 74 is formed with screw receiving holes 75 at respective positions corresponding to the screw holes 64 formed in the brim-like wall 62. Further, the outer peripheral face of the barrel body 71 is formed with a band-like groove 76 recessed from the surroundings.

Thus configured rod integrator holder 6 and relay lens barrel 7 are brought into contact with each other while in a state where the screw holes 64 formed in the brim-like wall 62 of the rod integrator 6 and the screw receiving holes 75 formed in the abutment 74 of the relay lens barrel 7 align with each other, and are connected to each other with screws, which are not depicted, so as to be secured. The projection 65 formed at the outer periphery of the brim-like wall 62 has an inner diameter slightly greater than the outer diameter of the light entrance end of the barrel body 71, so as to facilitate the positioning of the rod integrator holder 6 and the relay lens barrel 7 in directions orthogonal to the optical axis L, and cover the outer periphery of the light entrance end of the barrel body 71 when the rod integrator holder 6 and the relay lens barrel 7 are connected to each other, whereby the airtightness therebetween can be enhanced.

Although not depicted in FIG. 2, FIG. 3A and FIG. 3B, concave clearance grooves 67A to 67D elongated in the direction of the optical axis L are provided at the corners within the case 61 of the rod integrator holder 6 as shown in FIG. 1. The clearance grooves 67A to 67D are configured such that edges 84A to 84D in the direction of the length of the rod integrator 8 (the direction of the optical axis L) can be prevented from coming into contact with the inner faces 66A to 66D of the case 61.

Figure 4:
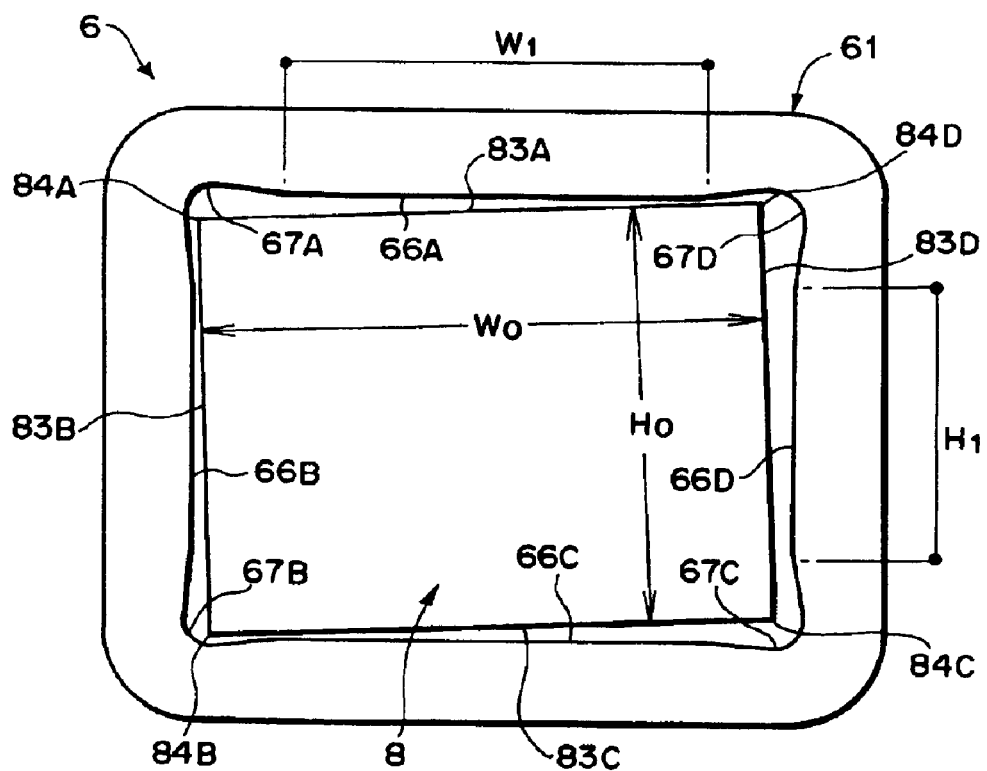
FIG. 4 is a view showing the workings of the rod integrator holder shown in FIG. 1.
Figure 7:
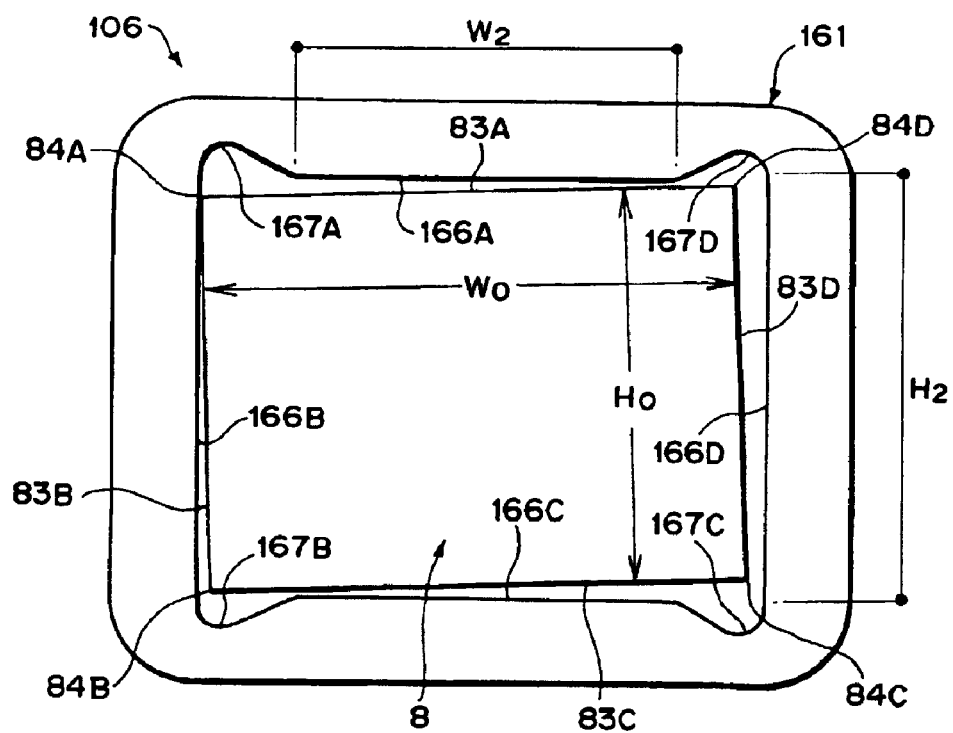
FIG. 7 is a view showing the workings of a rod integrator holder of a comparative example.

The workings of the clearance grooves 67A to 67D will be described in greater detail with reference to FIG. 4 to FIG. 7. FIG. 4 which is a view showing the workings of this embodiment depicts the rod integrator holder 6 of this embodiment holding the rod integrator 8 in a state viewed from the light entrance end side. FIG. 7 which is a view showing the workings of a comparative example depicts a rod integrator 106 of the comparative example holding the rod integrator 8 in a state viewed from the light entrance end side.

As shown in FIG. 4, the clearance groove 67A provided at the corner situated at the upper left in the figure within the case 61 is formed so as to be laid on both the inner face 66A situated at the top in the figure within the case 61 and the inner face 66B situated on the left side in the figure. That is, by the clearance groove 67A, the part of the inner face 66A close to the clearance groove 67A and the part of the inner face 66B close to the clearance groove 67A are recessed (concaved) toward the outside of the case 61 with respect to the central part of the inner face 66A and the central part of the inner face 66B.

Likewise, the clearance groove 67B is formed so as to be laid on both the inner face 66B and the inner face 66C adjoining each other; the clearance groove 67C, so as to be laid on both the inner face 66C and the inner face 66D adjoining each other; and the clearance groove 67D, so as to be laid on both the inner face 66D and the inner face 66A adjoining each other. By provision of the clearance grooves 67A to 67D, the length $W_1$ of the linear parts in the direction of the width of the inner face 66A and the inner face 66C is shorter than the length $W_0$ in the direction of the width of the side face 83A and the side face 83C of the rod integrator 8. Likewise, the length $H_1$ of the linear parts in the direction of the width (in the direction of the height in the figure) of the inner face 66B and the inner face 66D is shorter than the length $H_0$ in the direction of the width (in the direction of the height in the figure) of the side face 83B and the side face 83D of the rod integrator 8.

On the other hand, in the rod integrator holder 106 of the comparative example shown in FIG. 7, grooves 167A to 167D are provided at the corners within the case 161 thereof. However, the grooves 167A to 167D are different in configuration from the above-described clearance grooves 67A to 67D in this embodiment as follows: The groove 167A provided at the corner situated at the upper left in the figure within the case 161 is formed only on the side of the inner face 166A situated at the top in the figure of the case 161, and is not formed on the side of the inner face 166B situated on the left side. That is, by the groove 167A, the part of the inner face 166A close to the groove 167A is formed so as to be recessed toward the outside of the case 161 with respect to the central part of the inner face 166A, whereas the part of the inner face 166B close to the grove 167A is formed so as to be substantially flush with the central part of the inner face 166B.

Likewise, the groove 167B and the groove 167C are formed only on the side of the inner face 166C, and the groove 167D is formed only on the side of the inner face 166A like the groove 167A. By the provision of the grooves 167A to 167D, the length $W_2$ of the linear parts in the direction of the width of the inner face 166A and the inner face 166C is shorter than the length $W_0$ in the direction of the width of the side face 183A and the side face 183C of the rod integrator 8, whereas the length $H_2$ of the linear parts in the direction of the width (in the direction of the height in the figure) of the inner face 166B and the inner face 166D is longer than the length $H_0$ in the direction of the width (in the direction of the height in the figure) of the side face 83B and the side face 83D of the rod integrator 8.

These differences in configuration result in the following differences in workings between the rod integrator holder 6 of this embodiment and the rod integrator holder 106 of the comparative example:

The rod integrator 8 is secured within the case 61 (161) of the rod integrator holder 6 (106) through an adhesive as described above, and there are cases where the rod integrator 8 tilts while the adhesive is curing. In the rod integrator holder 6 of this embodiment, however, by provision of the clearance grooves 67A to 67D configured as described above, even though the side faces 83A to 83D of the rod integrator 8 come into contact with the boundaries (convex parts) of the inner faces 66A to 66D of the case 61 with the clearance groves 67A to 67D, the edges 84A to 84D of the rod integrator 8 can be reliably prevented from coming into contact with the inner faces 66A to 66D of the case 61. Further, when the rod integrator 8 is inserted into the case 61 of the rod integrator holder 6, there is no possibility that the edges 84A to 84D of the rod integrator 8 come into contact with the inner faces 66A to 66D of the case 61.

Consequently, when some vibration is applied to the rod integrator holder 6 holding the rod integrator 8, the edges 84A to 84D of the rod integrator 8 can be prevented from being broken by coming into contact with the inner faces 66A to 66D of the case 61 and the edges 84A to 84D of the rod integrator 8 and the inner faces 66A to 66D of the case 61 rub against each other to generate dust due to abrasion.

On the other hand, in the rod integrator holder 106 of the comparative example shown in FIG. 7, there is a possibility that the edges 84A to 84D of the rod integrator 8 come into contact with the inner face 166B or the inner face 166D of the case 61 (FIG. 7 shows a state where the edge 84A is in contact with the inner face 166B). Consequently, when some vibration is applied to the rod integrator holder 106 holding the rod integrator 8, there are possibilities that the edges 84A to 84D of the rod integrator 8 are broken by coming into contact with the inner faces 166B and 166D of the case 161 and that the edges 84A to 84D of the rod integrator 8 and the inner faces 166B and 166D of the case 161 rub against each other to generate dust due to abrasion.

The radius of curvature of the bottoms (curved parts) of the clearance grooves 67A to 67D of the rod integrator holder 6 of this embodiment and the radius of curvature of the bottoms (curved parts) of the grooves 167A to 167D of the rod integrator holder 106 of the comparative example are substantially the same as each other (there are cases where forming such bottoms so as to be curved is necessary for maintaining the configuration of the mold used for molding). However, the center of curvature of the clearance grooves 67A to 67D in this embodiment is set in a position closer to the center of the cross section of the case 61 (161) than that of the grooves 167A to 167D in the comparative example.

Consequently, in the rod integrator holder 6 of this embodiment, a large gap is not formed between the clearance grooves 67A to 67D and the rod integrator 8 under the condition where the rod integrator holder 6 is holding the rod integrator 8, whereas in the rod integrator holder 106 of the comparative example, a larger gap is formed between the grooves 167A to 167D and the rod integrator 8. Because of these differences in configuration, although in the rod integrator holder 106 of the comparative example, the possibility is high that part of the light from the light source passes through the gap and the shape of the gap is projected onto the screen through the image display device, in the rod integrator holder 6 of this embodiment, the possibility of occurrence of this can be lowered.

The rod integrator holder 6 of this embodiment also produces the following effects: The rod integrator 8 is held within the case 61 of the rod integrator holder 6 without exposing itself except for the light entrance and exit faces, whereby the possibility of the rod integrator 8 being damaged upon handling can be lowered.

Further, the brim-like wall 62 and circumferential projection 65 of rod integrator holder 6 formed on the exit face 81 side of the rod integrator 8 function to prevent the exit face 81 from coming into contact with other members and the like, whereby the possibility of the exposed exit face 81 being damaged upon handling can be reduced as well. Therefore, the rod integrator 8 held by the rod integrator holder 6 is remarkably easy to handle at the time of assembling and the like.

Moreover, as shown in FIG. 2, when the rod integrator holder 6 and the relay lens barrel 7 are connected to each other, the opening on the entrance end side of the barrel body 71 is closed with the brim-like wall 62 of the rod integrator holder 6. Consequently, the space between the light exit face 81 of the rod integrator 8 and the entrance face of the relay lens 33 is tightly closed by the brim-like wall 62 of the rod integrator holder 6 and the barrel body 71 against the surroundings, whereby the light exit face 81 of the rod integrator 8 is prevented from being damaged or dust and the like are kept from attaching thereto.

In this embodiment, respective sizes of individual parts of the rod integrator holder 6 and relay lens barrel 7 are determined such that a predetermined optical length can immediately be secured between the light exit face 81 of rod integrator 8 and the relay lens 33 when the rod integrator holder 6 and the relay lens barrel 7 are connected to each other, which makes it easier to place them into the illumination optical system 3.

Figure 5:
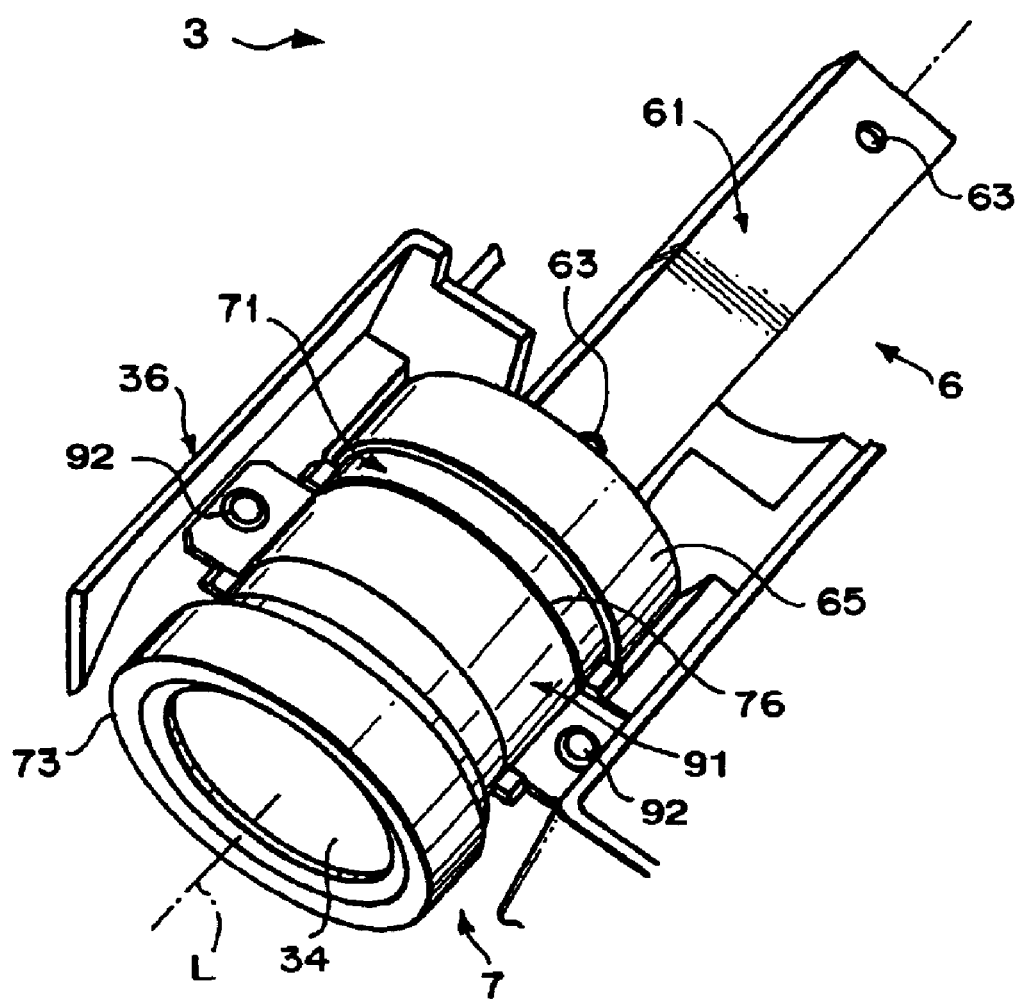
FIG. 5 is a general perspective view of the exterior of the light exit end tightly closed structure shown in FIG. 2.

FIG. 5 shows the rod integrator holder 6 and relay lens barrel 7 disposed within the illumination optical system 3. The rod integrator holder 6 and relay lens barrel 7 connected to each other as mentioned above are attached to a mount 36 disposed within the illumination optical system 3 by way of a semi-annular attachment 91 for pressing the groove 76 formed in the outer peripheral face of the body 71 against the mount 36 and attachment screws 92 for securing the attachment 91 to the mount 36.

In the projection type image display apparatus 1 provided with the rod integrator holder 6 configured as described above, as shown in FIG. 6, the luminous flux incident on the illumination optical system 3 from the light source section 2, decomposed by the color wheel apparatus 31 into individual color components in time division and then incident on a light entrance end face 82 of the rod integrator 8 has its density homogenized by the rod integrator 8, and is then emitted toward the reflecting mirror 35 by way of the relay lenses 33 and 34. The luminous flux incident on the reflecting mirror 35 is emitted toward the image display means 4 from the illumination optical system 3, and caused to carry image information in the image display means 4. Thereafter, a projection image is displayed on the screen by way of the projection lens within the projection lens barrel 51.

Although an embodiment of the present invention is explained in the foregoing, the present invention can be modified in various manners without being restricted to the above-mentioned embodiment.

For example, though the clearance groove is provided at each of the four corners within the case in the rod integrator holder of this embodiment, the clearance groove may be set so as not to be provided at all of the corners within the case. For example, a corner where the clearance groove is provided and a corner where the clearance groove is not provided are set, and in the vicinity of the corner where the clearance groove is not provided, a convex may be provided that is capable of preventing the edges of the rod integrator and the inner faces of the case from coming into contact with each other (having the function of preventing the edges of the rod integrator and the inner faces of the case from coming into contact with each other by coming into contact with the side faces of the rod integrator).

Moreover, though the outer periphery of the brim-like wall in the above-mentioned embodiment is equipped with a circumferential projection, such a circumferential projection may be omitted if a sufficiently airtight state can be obtained by the brim-like wall alone. Moreover, for securing a more reliably airtight state, an O-ring made of rubber or the like may be interposed between the brim-like wall of the rod integrator holder and the abutment of the relay lens barrel.

Although the rod integrator is constituted by a rod-shaped optical prism in the above-mentioned embodiment, hollow type rod integrators with mirror surfaces in their inner faces have also been known. Such a hollow type rod integrator is formed, for example, by four oblong glass sheets, each having one surface provided with a reflective coating, which are bonded and assembled into a box having a rectangular cross section in which the reflective coating surfaces face inside. Although the luminous flux incident on the hollow type rod integrator from the light source side is guided to the light exit end while being reflected by the mirror surfaces of the inner wall faces a plurality of times, the light exit end has no end face which may be damaged or bears dust attached thereto as in the prism type mentioned above. However, it may be problematic as with the prism type in that its optical characteristics will be lost if dust and the like attach to the mirror surfaces of its inner wall faces. The present invention is also applicable to rod integrators of the hollow type.

The present invention is usable not only in the above-mentioned video projector, but also in various optical instruments using a rod integrator.

As explained in detail in the foregoing, in the rod integrator holder in accordance with the present invention, since the concave clearance grooves capable of preventing contact with the edges of the rod integrator are provided at the corners within the tubular case in which the rod integrator is inserted, the edges of the rod integrator and the inner faces of the case can be prevented from coming into contact with each other.

Consequently, in the rod integrator holder and the projection type image display apparatus in accordance with the present invention, the edges of the rod integrator can be prevented from being broken by coming into contact with the inner faces of the case, and the edges of the rod integrator and the inner faces of the case can be prevented from rubbing against each other to generate dust due to abrasion. As a result, the optical characteristics of the rod integrator can be maintained, and the generated dust can be prevented from attaching to the light exit face of the rod integrator and being projected onto the screen under magnification.

What is claimed is:

1. A rod integrator holder having a tubular case in which a rod integrator is inserted, said rod integrator homogenizing a density of an incident luminous flux and emitting the density-homogenized luminous flux, wherein a concave clearance groove capable of preventing an inner face of said case and an edge of said rod integrator from coming into contact with each other is provided at a corner within said case so as to be laid on both of the adjoining inner faces of said case.

2. The rod integrator holder according to claim 1, wherein a brim-like wall substantially orthogonal to an axis of said case is provided at one end part of said case, and by allowing said brim-like wall to abut against a light entrance end side of a lens barrel, a space between said lens barrel and said case is tightly closed.

3. The rod integrator holder according to claim 1, wherein a side face of said case is formed with an adhesive injection hole into which a predetermined adhesive is injected, said rod integrator inserted in said case being secured and held within said case by said adhesive injected from said adhesive injection hole.

4. The rod integrator holder according to claim 2, wherein an outer peripheral part of said brim-like wall is formed with a circumferential projection for covering an outer peripheral face of said end part of said lens barrel when said brim-like wall abuts against said end part of said lens barrel.

5. A projection type image display apparatus comprises:

an illumination optical system in which said rod integrator holder according to claim 1 is disposed; image display means for converting illumination light from said illumination optical system into image display light carrying image information, and outputting thus obtained image display light; and a projection lens system emitting said image display light from said image display means and projecting an image onto an image projection surface.

* * * * *